Patented Apr. 22, 1952

2,593,434

UNITED STATES PATENT OFFICE 2,593,434

PROPYLENE GLYCOL SOLUTION OF ARSENIC MEDICAMENTS

Ernst A. H. Friedheim, New York, N. Y.

No Drawing. Application February 19, 1947, Serial No. 729,663

5 Claims. (Cl. 167—69)

This invention relates to therapeutically active compositions and has particular relation to injectable liquid compositions containing, in solution, therapeutically active organometallic compounds of the type described hereinafter. The invention also relates to processes of preparing such compositions.

The main object of the present invention is to provide therapeutically active solutions containing organometallic compounds formed by the reaction of organic arsenicals and organic dimercapto compounds.

A further object of the present invention is to provide injectable liquid compositions which contain therapeutically active organic arsenicals dissolved in suitable solvents, and are of relatively low toxicity.

Another object of this invention is to provide compositions of the above mentioned type which are resistant to heat and sufficiently stable to be stored.

It is also an object of the present invention to prepare solutions or compositions of the above mentioned type by dissolving or dispersing organic arsenicals on the one hand, and organic dithiols on the other hand, in suitable solvents and, if necessary, further treating the solution thus obtained.

Finally, it is also an object of my present invention to prepare solutions of the above mentioned type which contain certain additional ingredients adapted to increase the stability of the solutions.

Other objects and the advantages of the invention will be apparent from the following specification, which describes, by way of example, several preferred embodiments of my invention, and from the appended claims.

The therapeutically active organic arsenicals used according to the present invention are compounds of the formula

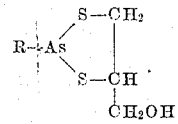

wherein R stands for a cyclic organic radical.

In carrying out my present invention, a compound of the above formula may be first prepared in the manner described hereinafter and the compound thus obtained may be dissolved in a suitable solvent, preferably propylene glycol. According to another embodiment of the invention, a suitable organic arsenical containing a trivalent arsenic radical and at least an equivalent amount of 2,3-dimercapto propanol are dissolved in propylene glycol in which they react to form a compound of the above structural formula. However, an organic arsenical containing a radical of pentavalent arsenic may also be used as a starting material and reacted in propylene glycol with at least 2 mols of 2,3-dimercapto propanol. In this embodiment, the 2,3-dimercapto propanol first causes reduction of the pentavalent arsenic to trivalent arsenic, whereafter reaction between the trivalent arsenic compound and 2,3-dimercapto propanol takes place.

*Example I.*—1/100 mol of the hydrochloride of 3-amino-4-hydroxy-phenylarsenoxide are dissolved in 48 ml. of water and enough sodium carbonate to form a clear solution having a pH of 6.0. With rapid stirring 1.1 ml. of 2,3-dimercapto propanol (11 millimols) are added. A whitish, gluey precipitate is formed, which changes to a granular white powder upon adjusting the pH to 7.5 and continuing stirring for half an hour. The precipitate is filtered off and washed abundantly with distilled water.

The product thus obtained has the formula

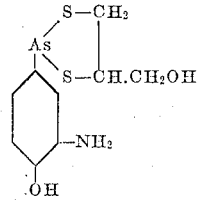

It is insoluble in water, readily soluble in cold acetone and cold ethanol, and sparingly soluble in cold methanol. It can be recrystallized from boiling methyl alcohol. In order to effect such recrystallization, is it dissolved in 40 ml. of boiling methanol, and the slightly turbid solution is filtered. On cooling the clear filtrate, a snow-white crystalline precipitate is formed, filtered off, washed with methanol and ether, and dried in vacuo. The compound as well as its hydrochloride salt is soluble in propylene glycol. This compound or preferably the hydrochloride salt is dissolved in substantially anhydrous propylene glycol to form a 5% solution adapted to be used for injections. The solution of the hydrochloride salt is distinguished by stability.

*Example II.*—Equimolecular amounts of 3-amino-4-hydroxy-phenylarsenoxide and 2,3-dimercapto propanol are reacted in propylene glycol at ordinary room temperature. In order to effect such reaction 2 g. of the above named arsenoxide and 1 ml. of 2,3-dimercapto propanol are dispersed and reacted in 40 ml. of propylene glycol at ordinary room temperature.

The composition thus formed contains the same compound as formed in Example I.

Instead of using an equimolecular amount of the 2,3-dimercapto propanol, an excess of the latter from 0.1 mol up to 5 mols may be used. It has been found that a moderate excess, for example .1 mol of the 2,3-dimercapto propanol increases the stability of the composition.

An analogous, therapeutically active solution is obtained by the use of the hydrochloride of the 3-amino-4-hydroxyphenylarsenoxide in the place of the free base mentioned above, as starting material.

*Example III.*—2.3 g. of a compound of the formula

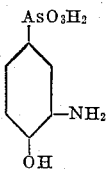

and 2.2 ml. of 2,3-dimercapto propanol are dispersed and reacted in 50 ml. of propylene glycol under heating to about 70° C. The reaction is completed in about 30 minutes. The composition thus obtained represents a solution of the same compound as obtained in Example I. In carrying out this reaction a certain amount of the 2,3-dimercapto propanol is oxidized and the oxidation product remains in solution.

An analogous, therapeutically active solution is obtained by using the hydrochloride of 3-amino-4-hydroxyphenylarsonic acid in lieu of the chlorine-free compound mentioned above.

*Example IV.*—2.5 g. of the compound of the formula

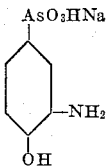

and 6.9 ml. of a 59% solution of ammonium thioglycolate are reacted in 50 ml. of water by heating, in a non-oxidizing atmosphere, for 1 hour at 70°, whereby a compound of the formula

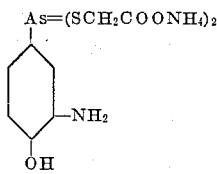

is formed. The reaction mixture is cooled and 1.1 ml. of 2,3-dimercaptopropanol are added with stirring, whereupon the same product is formed and isolated as in Example I. It is transformed into the corresponding hydrochloride as follows: 2 g. of the compound of the formula described in Example I are dissolved with warming in 40 ml. of water and 10 ml. of 4 N HCl. The solution is treated with iron-free charcoal and filtered. 20 ml. of ice-cold concentrated hydrochloric acid are added, with cooling, to the filtrate, whereupon the hydrochloride forms a white crystalline precipitate which is filtered off, washed with ice-cold 4 N HCl and dried in vacuo. 6 parts by weight of the hydrochloride are dissolved in 100 parts by weight of propylene glycol to form a readily injectable stable solution.

*Example V.*—3 parts by weight of the reaction product of 1 mol p-aminophenyl arsendichloride and 1.1 mol of 2,3-dimercaptopropanol are dissolved in 97 parts by weight of propylene glycol.

*Example VI.*—2.5 parts by weight of the reaction product of 1 mol of 3-acetylamino-4-hydroxyphenyl arsenoxide and 1.1 mol of 2,3-dimercapto-propanol, are dissolved in 97.5 parts by weight of propylene glycol.

*Example VII.*—2.5 parts by weight of the reaction product of 1 mol of 2-hydroxy-4-acetylamino-benzene-arsendichloride and 1.1 mol of 2,3-dimercapto-propanol are dissolved in 97.5 parts by weight of propylene glycol.

*Example VIII.*—1 part by weight of the compound of the formula

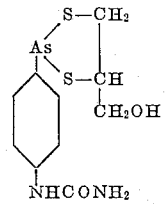

is dissolved in 99 parts by weight of propylene glycol.

*Example IX.*—1.5 parts by weight of the compound of the formula

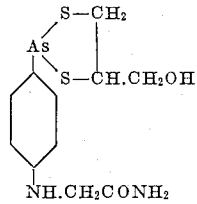

are dissolved in 98.5 parts by weight of propylene glycol.

*Example X.*—2 parts by weight of the compound of the formula

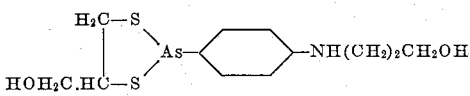

are dissolved in 98 parts by weight of propylene glycol.

*Example XI.*—4.5 g. of the reaction product of 1 mol of p-hydroxy-phenyl arsenoxide and 1.1 mol of 2,3-dimercaptopropanol are dissolved in 95.5 g. of propylene glycol.

The arsenic compounds used in the above Examples V–XI, may be prepared according to the methods described in my co-pending application Ser. No. 724,925, filed on January 28, 1947. Instead of preparing the isolated compounds, the reactants may be reacted in propylene glycol as a reaction medium, so that the propylene glycol solution may be obtained from the arsenical used as starting material, 2,3-dimercapto-propanol, and propylene glycol, in a one-step process. The presence of free 2,3-dimercapto propanol in amounts of $\tfrac{1}{10}$ to $\tfrac{5}{10}$ mol per one mol of the arsenic compound has been found to increase the stability of the solutions, and the presence of thioglycollic acid or cystein, in similar proportions, in the propylene glycol solution has been found to have a similar stabilizing effect. To the solution other substances, such as ascorbic acid, may be added, if desired. In carrying out the present invention, I prefer the use of propylene glycol which is substantially free from water. Furthermore, in preparing solutions according to this invention, suitable inorganic or organic salts of the arsenic compounds may be used.

Reference is made to my co-pending application Ser. No. 724,925 filed on January 28, 1947, of which this is a continuation in part.

What I claim is:

1. A therapeutically active composition, comprising a compound of the formula

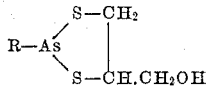

wherein R is an aryl radical, dissolved in propylene glycol.

2. A composition as claimed in claim 1, in which substantially anhydrous propylene glycol is used.

3. A therapeutically active composition, comprising a compound of the formula

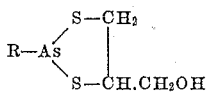

wherein R is an aryl radical, dissolved in propylene glycol, and a substance of the group consisting of 2,3-dimercaptopropanol, thioglycollic acid and cystein, as stabilizing agent.

4. A therapeutically active composition, comprising a compound of the group consisting of the compound of the formula

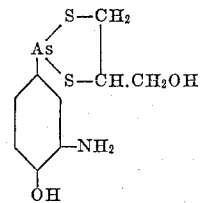

and salts of this compound, dissolved in propylene glycol.

5. A therapeutically active composition, comprising a compound of the group consisting of the compound of the formula

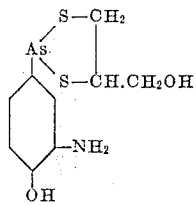

and salts of this compound, and a substance of the group consisting of 2,3-dimercaptopropanol, thioglycollic acid and cystein, as stabilizing agent, dissolved in propylene glycol.

ERNST A. H. FRIEDHEIM.

REFERENCES CITED

The following references are of record in the file of this patent:

UNITED STATES PATENTS

| Number | Name | Date |
| --- | --- | --- |
| 2,035,153 | Elger | Mar. 24, 1936 |
| 2,047,275 | Lott | July 14, 1936 |
| 2,283,817 | Martin | May 19, 1942 |
| 2,289,878 | Fehrle et al. | July 14, 1942 |
| 2,330,963 | Feinberg | Oct. 5, 1943 |

OTHER REFERENCES

Science News Letter for December 1, 1945, p. 338.

Sandground: The Jour. of Pharm. & Exptl. Therapeutics, vol. 80, No. 4, April 1944.

Cohen et al.: J. Chem. Soc., part X, pp. 3043 to 3057.

Peters et al.: Nature, vol. 156, November 24, 1945, pp. 616 to 619.

Wilson et al.: J. Bact., vol. 54, October 1947, p. 80.

Powers: "Advancing Fronts in Chemistry," vol. II, Chemotherapy, Reinhold Pub. Co., N. Y., 1946, pp. 99–100.